US012754291B2

(12) United States Patent
Cheng et al.

(10) Patent No.: US 12,754,291 B2
(45) Date of Patent: Oct. 6, 2026

(54) DISPLAY ASSEMBLY AND DISPLAY DEVICE

(71) Applicant: VIVO MOBILE COMMUNICATION CO., LTD., Dongguan (CN)

(72) Inventors: Tong Cheng, Dongguan (CN); Huaxin Lin, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 932 days.

(21) Appl. No.: 18/098,864

(22) Filed: Jan. 19, 2023

(65) Prior Publication Data

US 2023/0152426 A1 May 18, 2023

Related U.S. Application Data

(63) Continuation of application No. PCT/CN2021/107765, filed on Jul. 22, 2021.

(30) Foreign Application Priority Data

Jul. 23, 2020 (CN) ........................ 202010718348.X

(51) Int. Cl.

| | |
|---|---|
| ***G01S 7/481*** | (2006.01) |
| ***G02B 17/08*** | (2006.01) |
| ***H04M 1/02*** | (2006.01) |

(52) U.S. Cl.

CPC .......... *G01S 7/4813* (2013.01); *G01S 7/4817* (2013.01); *G02B 17/0856* (2013.01); *H04M 1/0266* (2013.01)

(58) Field of Classification Search

CPC . G01S 7/4813; G01S 7/4817; G02B 17/0856; H04M 1/0266

USPC ........................................................ 356/4.01

See application file for complete search history.

(56) References Cited

U.S. PATENT DOCUMENTS

| | | | | |
|---|---|---|---|---|
| 9,951,935 B2 * | 4/2018 | Cotte | ................ | G02F 1/133603 |
| 10,620,745 B2 | 4/2020 | He et al. | | |
| 10,678,043 B2 | 6/2020 | Ding et al. | | |
| 10,984,213 B2 | 4/2021 | He et al. | | |
| 11,030,434 B2 | 6/2021 | He et al. | | |
| 2008/0211779 A1 * | 9/2008 | Pryor | .................... | G06F 3/0425 345/173 |

(Continued)

FOREIGN PATENT DOCUMENTS

| | | |
|---|---|---|
| CN | 107422571 A | 12/2017 |
| CN | 109074495 A | 12/2018 |

(Continued)

*Primary Examiner* — Helal A Algahaim
*Assistant Examiner* — James W. Napier
(74) *Attorney, Agent, or Firm* — The Webb Law Firm

(57) ABSTRACT

A display assembly includes: a display panel; a cover plate, disposed on a display side of the display panel; a diverging element, located on a side of the cover plate close to the display panel, where the diverging element is disposed in a non-display region of the cover plate and is configured to diverge received light and emit diverged light; an emission module, configured to emit light, where the emission module is disposed on a non-display side of the display panel and faces the diverging element; and a receiving module, disposed on the non-display side of the display panel and configured to receive reflected light that is formed by a detection target through reflecting light diverged by the diverging element.

7 Claims, 3 Drawing Sheets

(56) References Cited

U.S. PATENT DOCUMENTS

| | | | | |
|---|---|---|---|---|
| 2011/0235018 | A1* | 9/2011 | Mori | G01S 7/497 356/5.01 |
| 2015/0362655 | A1 | 12/2015 | Wang et al. | |
| 2019/0251749 | A1* | 8/2019 | Rhodes, Jr. | G06T 19/20 |
| 2020/0275000 | A1 | 8/2020 | Zhu et al. | |
| 2022/0159169 | A1 | 5/2022 | Tang et al. | |
| 2023/0057020 | A1* | 2/2023 | Wassvik | G06F 3/14 |

FOREIGN PATENT DOCUMENTS

| | | | |
|---|---|---|---|
| CN | 109142391 | A | 1/2019 |
| CN | 109154959 | A | 1/2019 |
| CN | 109709743 | A | 5/2019 |
| CN | 109862160 | A | 6/2019 |
| CN | 110049214 | A | 7/2019 |
| CN | 110299072 | A | 10/2019 |
| CN | 110520863 | A | 11/2019 |
| CN | 110569825 | A | 12/2019 |
| CN | 110619305 | A | 12/2019 |
| CN | 110691153 | A | 1/2020 |
| CN | 210093396 | U | 2/2020 |
| CN | 110913040 | A | 3/2020 |
| CN | 210155472 | U | 3/2020 |
| CN | 210155688 | U | 3/2020 |
| CN | 110994353 | A | 4/2020 |
| CN | 111052138 | A | 4/2020 |
| CN | 210295114 | U | 4/2020 |
| CN | 111316287 | A | 6/2020 |
| CN | 111739428 | A | 10/2020 |
| CN | 111768711 | A | 10/2020 |
| WO | 2018127101 | A1 | 7/2018 |

* cited by examiner

DISPLAY ASSEMBLY AND DISPLAY DEVICE

CROSS-REFERENCE TO RELATED APPLICATIONS

This application is a Bypass Continuation application of PCT/CN2021/107765 filed Jul. 22, 2021, and claims priority to Chinese Patent Application No. 202010718348.X filed Jul. 23, 2020, the disclosures of which are hereby incorporated by reference in their entireties.

BACKGROUND OF THE INVENTION

Field of the Invention

This application relates to the field of communication technologies, and in particular, to a display assembly and a display device.

Description of Related Art

With the development of mobile intelligent terminals, the three-dimensional (3D) sensing technology gradually becomes a standard hardware configuration of smartphones. Time of flight (TOF) is widely applied. In smartphones, the TOF is applied to physical ranging, 3D modeling, photographing performance improvement, and the like.

SUMMARY OF THE INVENTION

According to a first aspect, an embodiment of this application provides a display assembly, including:

- a display panel;
- a cover plate, disposed on a display side of the display panel;
- a diverging element, located on a side of the cover plate close to the display panel, where the diverging element is disposed in a non-display region of the cover plate and is configured to diverge received light and emit diverged light;
- an emission module, configured to emit light, where the emission module is disposed on a non-display side of the display panel and faces the diverging element; and
- a receiving module, disposed on the non-display side of the display panel and configured to receive reflected light that is formed by a detection target through reflecting light diverged by the diverging element.

According to a second aspect, an embodiment of this application provides a display device, including the display assembly in the foregoing embodiment.

REFERENCE NUMERALS IN THE DRAWINGS

Figure 1:
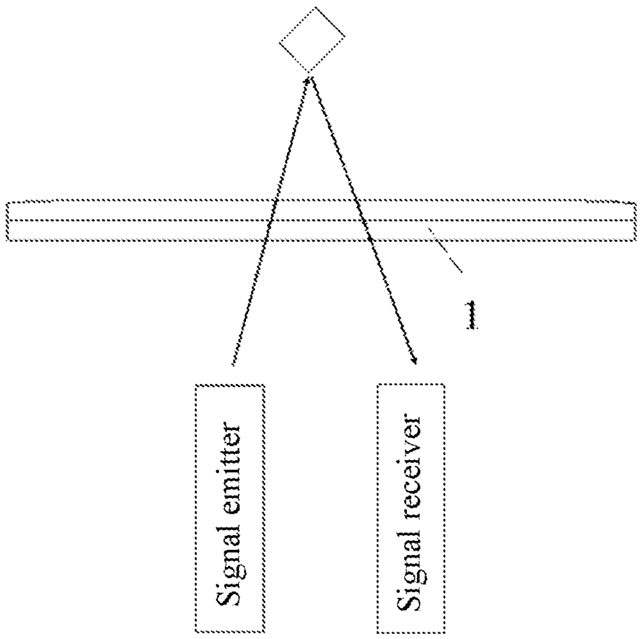
FIG. 1 is a transmission path of a laser signal.

- Display panel 10;
- Cover plate 20;
- Diverging element 30;
- Receiving module 40;
- Light source 50; Light collimator 51; First prism 52; Second prism 53;
- Housing structure 54; Rhombic prism 55;
- Frame body 60;
- Base plate 70; Chip 71; Glass substrate 72; Optical structure 73;
- Detection target 80.

DETAILED DESCRIPTION OF THE INVENTION

The following clearly describes the technical solutions in the embodiments in this application with reference to the accompanying drawings in the embodiments of this application. Apparently, the described embodiments are merely some but not all of the embodiments of this application. All other embodiments obtained by a person of ordinary skill in the art based on the embodiments of this application shall fall within the protection scope of this application.

Terms "first", "second", and the like in the specification and claims of this application are used to distinguish similar objects, but are not used to describe a specific sequence or order. It should be understood that the data so used may be interchanged in an appropriate condition, so that the embodiments of this application can be implemented in an order other than those illustrated or described herein. In addition, in this specification and the claims, "and/or" represents at least one of the connected objects, and the character "/" generally indicates an "or" relationship between the associated objects.

A display assembly provided in the embodiments of this application is described below with reference to the accompanying drawings by using embodiments and application scenarios thereof.

Currently, as shown in FIG. 1, when under-screen TOF design is adopted, a laser signal emitted by a signal emitter passes through a display 1 twice before being received by a signal receiver. The transmittance of the display 1 has great impact on TOF imaging. A laser signal of a TOF detection target passes through a display twice, and experiences two significant attenuations, which leads to extremely low utilization of laser energy. Due to the high energy of the TOF laser, when an infrared laser illuminates a display region of the display from the rear side, an organic light-emitting material of display pixels in the illuminated region ages severely. As a result, the display effect of the illuminated region has an obvious color difference, which leads to serious quality problems.

Figure 3:
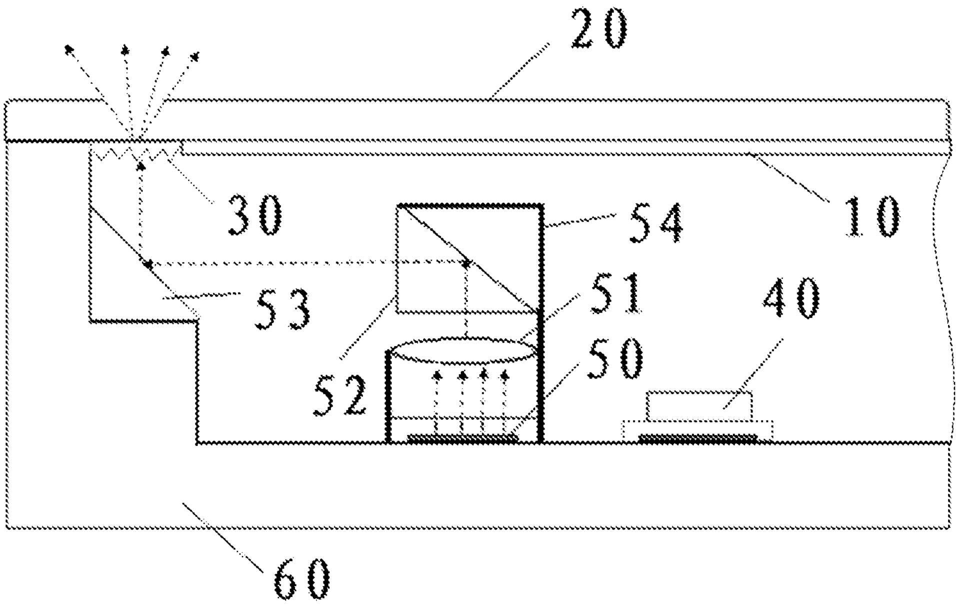
FIG. 3 is a schematic structural diagram of a display assembly according to an embodiment of this application.
Figure 4:
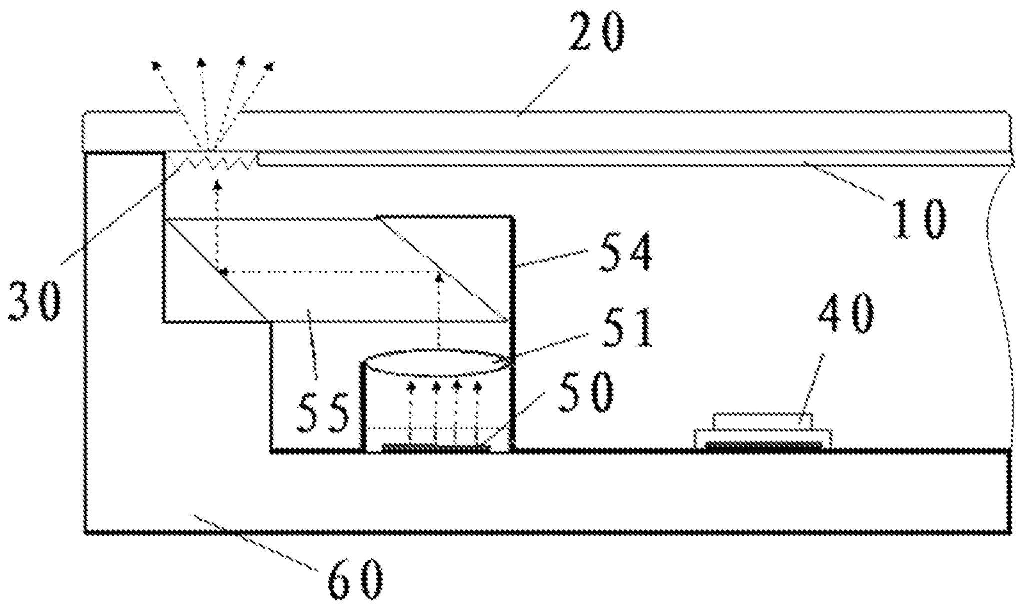
FIG. 4 is another schematic structural diagram of a display assembly according to an embodiment of this application.

As shown in FIG. 3 and FIG. 4, according to an embodiment of this application, the display assembly includes a display panel 10, a cover plate 20, a diverging element 30, an emission module, and a receiving module 40. The cover plate 20 is disposed on a display side of the display panel 10. The diverging element 30 is located on a side of the cover plate 20 close to the display panel 10. The diverging element 30 is disposed in a non-display region of the cover plate 20 and is configured to diverge received light and emit diverged light. The emission module is configured to emit the light. The emission module is disposed on a non-display side of the display panel 10 and faces the diverging element 30. The receiving module 40 is disposed on the non-display side of the display panel 10 and is configured to receive reflected light that is formed by a detection target through reflecting light diverged by the diverging element 30.

Figure 2:
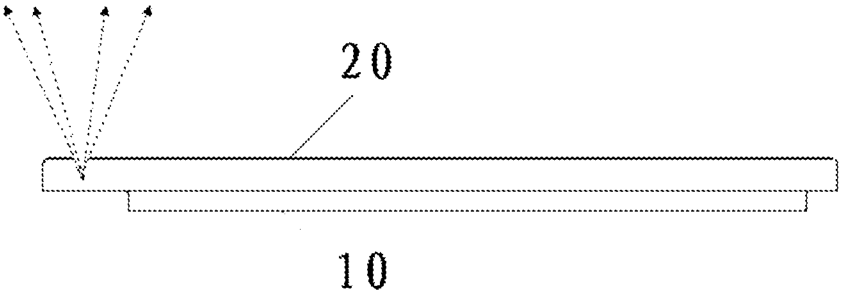
FIG. 2 is a schematic diagram of a region of light emission according to an embodiment of this application.

In other words, the display assembly mainly includes the display panel 10, the cover plate 20, the diverging element 30, the emission module, and the receiving module 40. The cover plate 20 may be a member made of a transparent material, such as a glass plate, and may be disposed on the display side of the display panel 10. The display panel 10 may be protected by the cover plate 20. The diverging element 30 may diverge light incident on the diverging element 30, so that light transmitted from the diverging element 30 has a large angle and can illuminate a large region. The diverging element 30 may be located on the side of the cover plate 20 close to the display panel 10. The diverging element 30 and the display panel 10 are located on the same side of the cover plate 20. The diverging element 30 is disposed on the non-display region of the cover plate 20 and is configured to diverge received light and emit diverged light. The non-display region is a region of the cover plate 20 that is not covered by the display panel 10, that is, the diverging element 30 is disposed on the region of the cover plate 20 that is not covered by the display panel 10. For example, as shown in FIG. 2, the diverging element 30 may be disposed on a non-display region on the top or a side of the cover plate 20, so that the light can exit from the non-display region on the top or the side of the cover plate 20.

The emission module may be configured to emit light, and the light emitted by the transmission module may be transmitted to the diverging element 30. The emission module is disposed on the non-display side of the display panel 10 and faces the diverging element 30. The emission module emits light to the diverging element 30. The diverging element 30 may diverge the light after receiving the light emitted by the emission module. The receiving module 40 is disposed on the non-display side of the display panel 10, and may be configured to receive reflected light that is formed by a detection target through reflecting light diverged by the diverging element 30. The receiving module 40 may include a module lens and a module image sensor, and may receive a light signal through the module lens and the module image sensor. The display assembly may further include a processing module, and the light signal is processed by the processing module. When the detection target is close to a side of the cover plate away from the display panel 10, the detection target starts to reflect light after entering a region of light diverged by the diverging element 30. The receiving module 40 may receive light reflected by the detection target, to perform identification and analysis and make decisions according to the received reflected light. In the display assembly of this application, the light emitted by the emission module to the diverging element is diverged by the diverging element to form a light region with a large angle. Light is diverged from the non-display region of cover plate 20 and does not pass through the display panel 10 during emission. In this way, a light signal loss is reduced and light utilization is increased. The damage to the organic light-emitting material when the light illuminates the display region is reduced, and the color difference in the display effect of the illuminated region is reduced, thereby avoiding serious quality problems and punching on the display panel.

Figure 5:
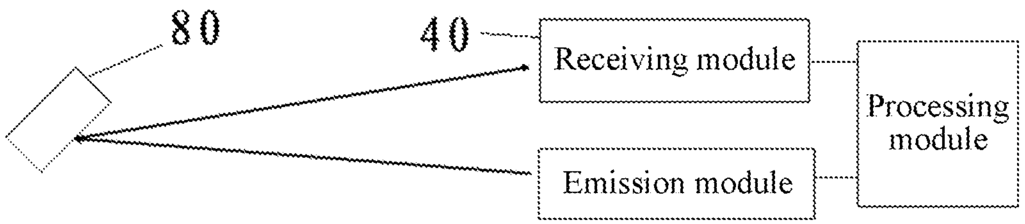
FIG. 5 is a schematic diagram of a working process according to an embodiment of this application.

In an application process, as shown in FIG. 5, the emission module emits modulated light, such as near-infrared light. The light is reflected after encountering the detection target 80, and the receiving module 40 may receive light reflected by the detection target. The processing module calculates a time difference or phase difference between emission and reflection of the light to infer a distance of a photographed object, so as to generate depth information. Moreover, the object may be photographed by using a camera, to present three-dimensional contours of the object in a form of a topographic map with different colors representing different distances.

In some embodiments of this application, the cover plate 20 may be provided with an optical adhesive layer in a region corresponding to the diverging element 30, where the optical adhesive layer may be a transparent optical adhesive layer. The diverging element 30 may be glued on the cover plate 20 by the optical adhesive layer for ease of installing the diverging element 30. The diverging element 30 may also be glued on the cover plate 20 by other highly-transparent glue with high transmittance for the light emitted by the emission module. The light emitted by the emission module can pass through the optical adhesive layer, thereby avoiding a light loss caused by the optical adhesive layer. Alternatively, the diverging element 30 may be integrated with the cover plate 20 to reduce fitting processes and a quantity of devices.

In some embodiments, the emission module may include a light source 50 and an optical component. The light source 50 may be configured to emit light. The optical component may be configured to receive the light emitted by the light source 50, and may transmit the received light to the diverging element 30. After the light is diverged by the diverging element 30, the light transmitted from the diverging element 30 has a large angle and can illuminate a large region.

The emission module further includes a light collimator 51. Collimated light is transmitted from the light collimator 51 after the light emitted by the light source 50 is collimated by the light collimator 51. The light is collimated by the light collimator 51, thereby ensuring that a transmission path of the light is in a fixed region. The optical component adjusts the collimated light. For example, the optical component may adjust a transmission direction of the collimated light, or may cause the collimated light to be displaced/shifted. The optical component may transmit the adjusted light to the diverging element 30.

In some other embodiments of this application, the emission module may include a light source 50, a light collimator 51, and an optical component. The light source 50 may emit light, for example, a laser or an infrared ray. The light source 50 may be a vertical-cavity surface-emitting laser (VCSEL) chip, or an edge emitting laser (EEL) chip. The light emitted by the light source 50 may be transmitted to the light collimator 51. Collimated light may be transmitted after the light emitted by the light source 50 is adjusted by the light collimator 51. The light is collimated by the light collimator 51, thereby ensuring that the transmission path of the light is in the fixed region. The optical component may receive the collimated light from the light collimator 51 and adjust the collimated light. For example, the optical component may adjust the transmission direction of the collimated light, or may cause the collimated light to be displaced/shifted. The optical component transmits the adjusted light to the diverging element 30. The light source 50, the light collimator 51, and the optical component jointly cause the light to be transmitted to the diverging element 30. After being diverged by the diverging element 30, the light is transmitted from the non-display region of the cover plate 20 to form a light region with a large angle for ease of detecting a detection target.

Figure 6:
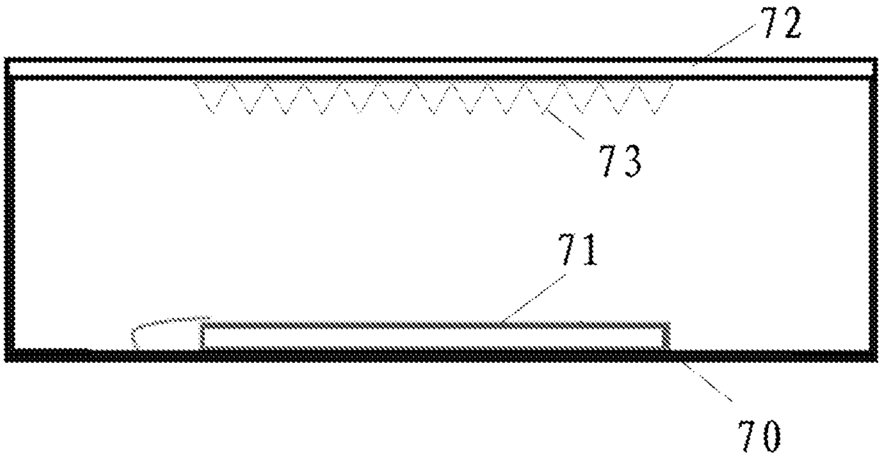
FIG. 6 is a schematic diagram of a VCSEL chip according to an embodiment of this application.

As shown in FIG. 6, the VCSEL chip may include a base plate 70, and a side wall disposed on the base plate 70. The base plate 70 and the side wall may define a cavity in which a chip 71 connected to a gold wire may be disposed. A glass substrate 72 is disposed at an opening of the cavity to close the cavity. The glass substrate 72 may be provided with an optical structure 73 (such as a diffuser) on a side facing the chip 71, so that the light is diffused evenly with a large angle and the light emitted by the chip can be transmitted through the optical structure.

In some embodiments, as shown in FIG. 3, the optical component may include a first prism 52 and a second prism 53. The collimated light transmitted from the light collimator 51 is transmitted to the first prism 52, and the first prism 52 may adjust the transmission direction of the collimated light. The collimated light adjusted by the first prism 52 may be transmitted to the second prism 53, and the second prism 53 may adjust the transmission direction of the light transmitted from the first prism 52, so that the adjusted light is transmitted to the diverging element 30. The first prism 52 and the second prism 53 are used for adjusting the transmission direction of the collimated light transmitted from the light collimator 51. The light is then transmitted to the diverging element 30 and diverged by the diverging element 30, and is transmitted from the non-display region of the cover plate 20. In this way, an even light region with a large angle required for object detection is generated. Installation positions of the first prism 52, the second prism 53, the light source 50, and the light collimator 51 may be set as required. Besides, different optical structures may be added to adjust the transmission direction of the light.

Optionally, as shown in FIG. 3, the emission module may further include a housing structure 54. The light source 50, the light collimator 51, and the first prism 52 may be encapsulated in the housing structure 54. The housing structure 54 encapsulates the light source 50, the light collimator 51, and the first prism 52 together, which can achieve a good integration effect and avoid relative position movement among the light source 50, the light collimator 51, and the first prism 52. In this way, deviation of the light transmission direction is reduced, thereby ensuring the accuracy of the light transmitted from the first prism 52.

In this embodiment of this application, the emission module may further include a housing structure 54. The light source 50 and the light collimator 51 may be encapsulated in the housing structure 54. The housing structure 54 encapsulates the light source 50 and the light collimator 51 together, which can achieve a good integration effect and help ensure the accuracy of the light transmitted from the light collimator 51. The first prism 52 may be disposed on the non-display side of the display panel 10, glued to the non-display side of the display panel 10 by an optical clear adhesive, and disposed on the display panel 10.

Optionally, the display assembly may further include a frame body 60. The second prism 53 may be disposed on the frame body 60, and the cover prism 20 may be connected to the frame body 60. Alternatively, the receiving module 40 may be disposed on the frame body 60. The light source 50 and the light collimator 51 may be disposed on the frame body 60. The frame body 60 may support and fix other components in the assembly.

In some embodiments of this application, as shown in FIG. 4, the optical component may include a rhombic prism 55. The collimated light transmitted from the light collimator 51 may be transmitted to the rhombic prism 55. The rhombic prism 55 may cause the collimated light transmitted from the light collimator 51 to be displaced/shifted, so that the displaced/shifted light is transmitted to the diverging element 30. The rhombic prism 55 may adjust the displacement of the collimated light transmitted from the light collimator 51, without adjusting the transmission direction of the collimated light. In other words, the collimated light incident on the rhombic prism 55 is adjusted by the rhombic prism 55, and the light transmitted from the rhombic prism 55 is transmitted to the diverging element 30. A position relationship between the rhombic prism 55 and the light collimator 51 may be adjusted as required, so as to meet space installation requirements. The emission module may further include a housing structure 54. The light source 50 and the light collimator 51 may be encapsulated in the housing structure 54, and the rhombic prism 55 may be connected to the housing structure 54. A side of the rhombic prism 55 may be connected to the housing structure 54, and another side of the rhombic prism 55 may be connected to the frame body 60 by gluing. In this way, the rhombic prism 55 is stable and firm and does not become loose easily, thereby effectively reducing a tolerance of system assembly and ensuring the accuracy of the light.

In this embodiment of this application, the non-display region of the cover plate 20 may be coated with an ink layer, and the light emitted by the emission module may pass through the ink layer. For example, the light emitted by the emission module is an infrared ray. The infrared ray can pass through the ink layer, thereby avoiding a loss of light caused by the ink layer.

An embodiment of this application further provides a display device, including the display assembly in the foregoing embodiment. In the display device of this application, light emitted by an emission module does not pass through a display panel. In this way, a light signal loss is reduced and light utilization is increased. Damage to an organic light-emitting material when the light illuminates a display region is reduced, thereby improving a display effect and avoiding punching on the display panel.

The embodiments of this application have been described above with reference to the accompanying drawings. This application is not limited to the embodiments described above, and the embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. A display assembly, comprising:

a display panel;

a cover plate, disposed on a display side of the display panel;

a diverging element, wherein the diverging element and the display panel are located on a same side of the cover plate, and the diverging element is disposed in a non-display region of the cover plate and is configured to diverge received light and emit diverged light;

an emission module, configured to emit light, wherein the emission module is disposed on a non-display side of the display panel and faces the diverging element; and a receiving module, disposed on the non-display side of the display panel and configured to receive reflected light that is formed by a detection target through reflecting light diverged by the diverging element;

wherein the emission module comprises:

a light source, configured to emit light; and an optical component, configured to receive the light emitted by the light source and transmit the received light to the diverging element;

wherein the emission module further comprises:

a light collimator, wherein collimated light is transmitted from the light collimator after the light emitted by the light source is collimated by the light collimator, and the optical component adjusts the collimated light and transmits adjusted light to the diverging element.

2. The display assembly according to claim 1, wherein the optical component comprises:

a first prism, wherein the collimated light transmitted from the light collimator is transmitted to the first prism; and a second prism, wherein the second prism adjusts a transmission direction of light transmitted from the first prism to cause adjusted light to be transmitted to the diverging element.

3. The display assembly according to claim 2, wherein the emission module further comprises:

a housing structure, wherein the light source, the light collimator, and the first prism are encapsulated in the housing structure.

4. The display assembly according to claim 2, wherein the emission module further comprises:

a housing structure, wherein the light source and the light collimator are encapsulated in the housing structure, and the first prism is disposed on the non-display side of the display panel.

5. The display assembly according to claim 4, wherein the first prism is disposed on the display panel.

6. The display assembly according to claim 2, further comprising:

a frame body, wherein the second prism is disposed on the frame body and the cover plate is connected to the frame body.

7. The display assembly according to claim 1, wherein the optical component comprises:

a rhombic prism, wherein the collimated light transmitted from the light collimator is transmitted to the rhombic prism, and the rhombic prism causes the collimated light from the light collimator to be shifted, so that shifted light is transmitted to the diverging element; and the emission module further comprises a housing structure, wherein the light source and the light collimator are encapsulated in the housing structure and the rhombic prism is connected to the housing structure.

* * * * *